United States Patent [19]
Morita et al.

[11] Patent Number: 5,186,955
[45] Date of Patent: Feb. 16, 1993

[54] MOLD FOR PRODUCING A MAGNETIC TAPE CASSETTE

[75] Inventors: Kiyoo Morita; Kengo Oishi, both of Kanagawa, Japan

[73] Assignee: Fuji Photo Film Co., Ltd., Kanagawa, Japan

[21] Appl. No.: 747,835

[22] Filed: Aug. 21, 1991

Related U.S. Application Data

[62] Division of Ser. No. 327,263, Mar. 22, 1989, Pat. No. 5,084,223.

[30] Foreign Application Priority Data

Mar. 25, 1988 [JP] Japan ................ 63-38494[U]
Nov. 15, 1988 [JP] Japan ................ 63-147999

[51] Int. Cl.$^5$ ............................. B29C 45/16
[52] U.S. Cl. ...................... 425/130; 264/245; 264/328.7; 264/328.8; 264/328.9; 425/556; 425/573
[58] Field of Search ............... 425/130, 577, 573, 588, 425/554, 556; 264/161, 245, 255, 328.7, 328.8, 328.9, 328.11, 328.12, 328.13, 1.7

[56] References Cited

U.S. PATENT DOCUMENTS

| 3,333,300 | 8/1967 | Cohan | 264/328.9 |
| 4,726,758 | 2/1988 | Sekine et al. | 264/245 |
| 4,840,760 | 6/1989 | Oishi | 264/1.7 |

OTHER PUBLICATIONS

Injection Molding Handbook, 1986, pp. 184, 185.

*Primary Examiner*—Tim Heitbrink
*Attorney, Agent, or Firm*—Sughrue, Mion, Zinn, Macpeak & Seas

[57] ABSTRACT

A mold for forming a magnetic tape cassette and a method for multi-color molding a magnetic tape cassette or the like. Sprue-runners connected to submarine gates used in making at least portions of the cassette are formed with notches near the submarine gates to reduce the cross-sectional area of the sprue-runners. As result, the sprue-runners can be easily cut off from the body of the cassette by breaking the notched portions.

4 Claims, 3 Drawing Sheets

MOLD FOR PRODUCING A MAGNETIC TAPE CASSETTE

This is a divisional of application Ser. No. 07/327,263 filed Mar. 22, 1989 now U.S. Pat. No. 5,084,223, issued Jan. 28, 1992.

BACKGROUND OF THE INVENTION

The present invention relates to a mold for making a magnetic tape cassette and to a method for molding a magnetic tape cassette or the like. Particularly, the invention relates to an improved mold and molding method for forming a magnetic tape cassette whose body is produced using a multi-color molding process.

In a conventional magnetic tape cassette for audio or video equipment or the like, a pair of hubs on which a magnetic tape is wound are rotatably supported in the cassette body. The body is composed of upper and lower halves, each of which is usually manufactured by the injection molding of a plastic or the like.

The cassette body is provided with one or more transparent or semitransparent windows through which the winding state of the magnetic tape can be viewed from the outside. Even if the entire cassette body is made of an optically transmissive material, the windows are often separately formed of a different optically transmissive material. This is due to the fact that the windows should have a higher optical transmissivity than the cassette body itself to provide for ease of viewing therethrough. The windows may be shaped in desired forms to produce a desired design effect.

Each of the windows is manufactured by bonding a separate window member to the cassette body through the use of an adhesive or using a process of ultrasonic welding or the like. However, there is a drawback in that it is necessary to separately manufacture the window member and thereafter to bond it to the cassette body. If the cassette body is made of the same optically transmissive material as the windows, there is another drawback in that the bonded portion of the cassette body is made more visible, thus generally degrading its appearance.

In order to eliminate such drawbacks, a method of manufacturing a magnetic tape cassette using a two-color molding process has recently been adopted. However, forming the window using the two-color molding method also creates problems. When one or more windows having a relatively complicated form are to be provided, as illustrated by windows 3a and 3b in FIG. 6, after the injection molding of the cassette body, cores having the same forms as the windows are moved in the direction of thickness of the body 2 of the cassette so that openings having the same forms as the windows are defined. A plastic for molding the windows is then injected in the direction of the thickness of the cassette body 2 through a direct gate or the like. At that time, slender intermediate portions already molded in the body, such as portion 2a located between the openings 3a and 3b, undergo either deformation due to the pressure or heat of the plastic injected into the openings or a color change due to resin streaking so that a desired form or appearance cannot be obtained.

These problems were successfully solved by the method described in the specification of commonly assigned Japanese Patent Application No. 62-16202. In the method disclosed in this application, which relates to the formation of a magnetic tape cassette by multi-color molding, an initially formed opening in a mold is filled with a molten resin that is to form the body of the cassette. Thereafter, a plurality of cores movable to change the size of said opening are moved to positions so as to define a new opening that communicates with a submarine gate, and the new opening is filled with a resin different from the previously charged resin through the submarine gate so as to mold the cassette body in more than one color.

This method, however, was later found to have several problems. When a submarine gate is used, it is generally desirable for the gate portion to be cut off the molded part (i.e., either half of the cassette) at a point where the resin temperature is fairly high. However, in the process of two-color molding described above, the body of the cassette is first molded before the windows are molded, so that by the time the molding cycle is completed, the sprue-runner to the cassette body through which the first resin was injected will have undergone excessive cooling, causing the resin to solidify to an unduly great extent. The resin then becomes extremely rigid and causes several problems in the step of cutting off the gate from the cassette body.

First, the sprue-runner to the submarine gate which has undergone a high degree of resin solidification is so rigid that the gate cannot be cut off the cassette body 2 without producing a jagged and indented surface such as would occur if the gate were merely torn off. This may be typified by a gate mark 60 that is created on the body 2 as shown in FIG. 7.

Secondly, in order to cut off the submarine gate, the mold is usually opened and the molded part and the sprue-runner are pushed almost simultaneously out of the cavity in one die part, thereby allowing the gate to be cut off along one edge of the die part. Thus, as shown schematically in FIG. 8, when the sprue-runner $S_0$ is pushed outwardly with an ejector pin 50, the frictional drag of this part on the mold M causes the central portion of the sprue-runner $S_0$ (where the sprue-runner is in contact with the ejector pin) to be separated first, and then the end of the sprue-runner (i.e., the gate portion G) is separated. In other words, the sprue-runner $S_0$ is deformed in the shape of an arch and the gate is torn off by the pushing force of the ejector pin 50. Furthermore, the warped sprue-runner after being separated from the mold M rebounds violently in the opposite direction and vibrates for a certain period of time. In this case, the end of the sprue-runner $S_0$ is subjected to a very strong centrifugal force and impact, and hence the chance of this portion (i.e., the cut face that has hardened excessively and which has become fairly brittle on account of cracking and other flaws that have developed as a result of tearing) of flying into pieces is increased. These pieces are not only dangerous to the operator, but they can also damage the demolded cassette half by producing a bruise or other surface flaws. The equipment around the injection molding machine can also be damaged by the flying pieces. Moreover, if such pieces are left on the parting line (PL) on the mold or within the mold cavity, not only is the efficiency of the molding operation reduced, but also the quality of the molded part will be adversely affected.

The severity of these problems associated with the flying of the end of the sprue-gate into pieces increases if cracking and other defects occur in the area at which the gate is cut off the molded part. In addition, if the number of molding steps is increased (i.e., more colors are used in the multi-color molding process), the cycle time becomes correspondingly longer, thus increasing the extent of deterioration in the cutting property of the gate.

The effect of such a poor cutting property of the gate portion is not limited to poor workability of molded parts. The flying pieces (fine particles) of the gate-forming resin tend to be deposited on the surface of the newly produced cassette half, thereby degrading the performance of the assembled tape cassette in that problems such as dropout become more pronounced.

It has been proposed that the submarine gate be cut off the molded part after reheating the sprue-runner. However, this method requires precise adjustments of the heating temperature; if the heating of the sprue-runner is excessive, not only is the cutting property of the gate impaired, but also the sprue-runner becomes too soft to be efficiently removed from the mold cavity automatically by suction or other suitable means. A further problem that occurs with this method is that the balance of cooling the molded part can be easily disturbed, causing deformation in the molded part.

SUMMARY OF THE INVENTION

An object, therefore, of the present invention is to provide a mold that is suitable for multi-color molding of a magnetic tape cassette using a submarine gate and which is designed to allow for easy cutting of the gate portion from the molded body of the cassette.

This and other objects of the present invention can be attained by a mold and a molding process for multi-color molding a magnetic cassette in which an initially formed opening in the mold is filled with a molten resin that is to form the body of the cassette, thereafter a plurality of cores are moved to change the size of the opening so as to define a new opening connected to a submarine gate, and the new opening is filled with a resin different from the previously charged resin through the submarine gate so as to mold the cassette a body in more than one color, in which mold a sprue-runner connected to the submarine gate is provided in the vicinity of the gate with a notch that reduces the cross-sectional area of the sprue-runner.

DESCRIPTION OF THE PREFERRED EMBODIMENTS

A preferred embodiment of the present invention as it is applied to a mold for making a magnetic tape cassette is described hereinafter.

Figure 1:
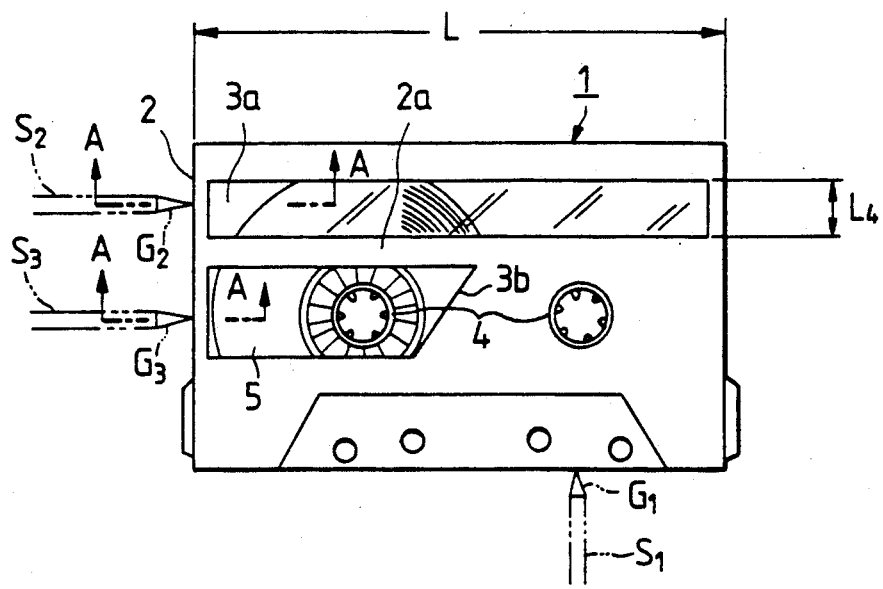
FIG. 1 is a plan view showing the upper half of a magnetic tape cassette made using the mold of the present invention.

FIG. 1 shows a plan view of a magnetic tape cassette 1 manufactured using the mold of the present invention. The magnetic tape cassette 1 is used with conventional audio equipment or the like. The cassette has a body 2 composed of an upper half part (shown) and a lower half part (not shown) combined together. A pair of hubs 4 on which a magnetic tape 5 is wound are rotatably supported in the body 2 of the cassette 1. The cassette body 2 is conventionally made of a plastic resin having a first color. Windows 3a and 3b are formed of a plastic resin having a second color.

Figure 2:
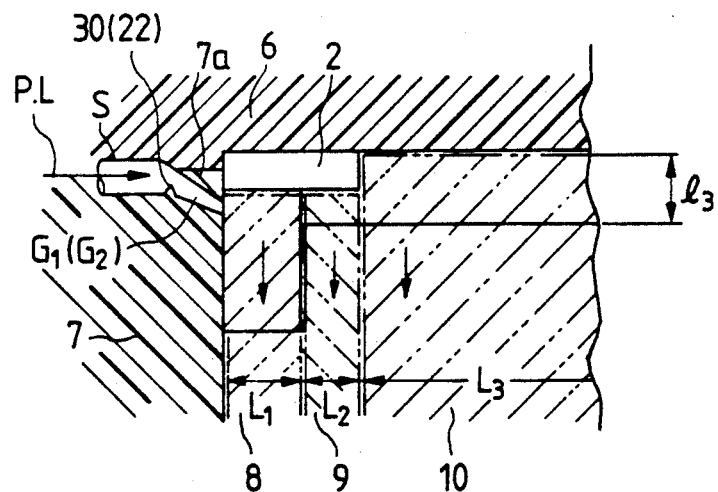
FIG. 2 is a sectional view of a major part of the mold which shows a first step of the process for making the upper half of a magnetic tape cassette.
Figure 3:
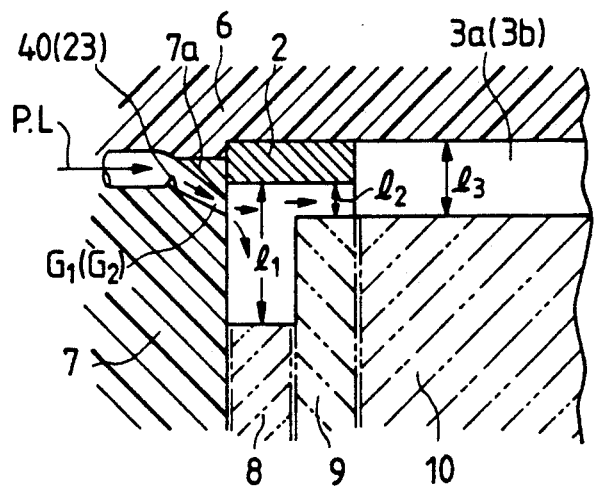
FIG. 3 is a sectional view of the major part of the same mold which shows a second step of the process.

The process of producing the upper half of the cassette body is described below with reference to FIGS. 2 and 3, which are partial cross sections of the mold taken along lines A—A in FIG. 1. FIG. 2 shows the first step of the process, and FIG. 3 the second step.

As shown in FIG. 2, the mold is basically composed of two members, a fixed die part 6 and a movable die part 7. A plurality of cores (in the case shown, three cores 8, 9 and 10) are disposed within the movable die part 7 for making windows 3a and 3b. These cores 8, 9 and 10 are juxtaposed in contact with each other in the longitudinal direction of the upper half of the cassette body in such a way that they correspond to submarine gates $G_2$ and $G_3$ at which sprue-runners $S_2$ and $S_3$ shown by phantom lines are terminated. The core 10 has the same dimensions as each of windows 3a and 3b (such as $L_3$ and $L_4$ shown in FIGS. 1 and 2). The dimension $L_1$ of the core 8 in the longitudinal direction of the upper half of cassette body may be equal to the thickness of the side wall of the latter, and the dimension of the core 8 in the direction of width of the cassette body is sufficient to cause the submarine gate $G_1$ to be connected to the opening that is to be formed when the core 8 is moved backward. The core 8 has a rectangular cross section. Needless to say, the dimension $L_2$ of the core 9 in the longitudinal direction of the cassette body is equal to the distance between the cores 8 and 10, whereas the dimension of the core 9 in the direction of width of the cassette body is equal to or greater than that of the core 8 in the same direction. The core 9 may also have a rectangular cross section.

In the first step of the process, a first molten resin, which is not light transmissive and which is to form the cassette body 2 except for the windows 3a and 3b, is injected into the mold through the sprue-runner $S_1$ and the submarine gate $G_1$. In this instance, cores 8, 9 and 10 are positioned as shown in FIG. 2. Core 8 closes the submarine gate $G_2$ and maintains an appropriate gap with respect to the fixed die part 6. The front faces of cores 8 and 9 are flush with each other, but the front face of core 10 is in contact with the fixed die part 6. Thus, the first-injected resin fills the opening defined by the mold cavity and the cores 8, 9 and 10 so as to form the cassette body 2 except for the windows 3a and 3b. In FIG. 1, the gate $G_1$ through which the first resin is to be injected is shown positioned on the front side of the cassette, but it may be disposed at any other appropriate position on the fixed die part 6.

After the first resin injected into the mold has adequately solidified, the cores 8, 9 and 10 are moved backward in the direction of thickness of the overall cassette body in the second step of the method. At that time, the core 8 is moved by a length $l_1$ to the rear end of the side wall of the cassette body 2, the core 10 is moved by a length $l_3$ in order to make the thickness of the window 3a nearly equal to that of the cassette body 2, and the core 9 is moved by a length $l_2$ in order to make the front faces of the cores 9 and 10 flush with each other. As a result of these movements of the cores, new openings for making windows 3a and 3b are defined which will communicate with submarine gates $G_2$ and $G_3$.

Thereafter, a second molten resin, which is light transmissive, is injected through the sprue-runners $S_2$ and $S_3$, and thence into the new openings in the mold through the submarine gates $G_2$ and $G_3$ simultaneously, whereupon the windows 3a and 3b are formed to complete the cycle of molding the upper half of the cassette body 2. Since the second resin flows into the new openings in the longitudinal direction (in the rightward direction as viewed in FIG. 3), the pressure of this resin's flow is lower than that of a resin injected in the direction of the width of the cassette body through a direct gate extending downward. For that reason, a slender intermediate portion 2a of low mechanical strength which is located between the windows 3a and 3b as shown in FIG. 1 is prevented from undergoing irregular movement due to the pressure.

After this molding of the cassette body 2 and windows 3a and 3b, those members may be demolded by the following procedures. When the die parts 6 and 7 are separated, two molded parts connected together by the sprue-runner $S_1$ (as well as by the sprue-runners $S_2$ and $S_3$) at the gates $G_1$ are exposed. The gates $G_1$ are shown clearly visible in FIG. 4 for clarity, but in the actual case they are positioned below a gate cutting portion 7a (the triangular portion shown in FIGS. 2 and 3), which is an integral part of the movable die part 7. The molded parts are then moved upward of the die part 7 in the direction of thickness of the cassette body 2, with the center of each of the sprue-runners $S_1$, $S_2$ and $S_3$ being pushed with ejector pins 50 and with appropriate areas of the cassette body 2 being also pushed with other ejector pins. Thus, the gate cutting portion 7a cuts into the gates $G_1$, $G_2$ and $G_3$, thereby allowing the sprue-runners $S_1$, $S_2$ and $S_3$ to be cut off the cassette body 2 in a very easy and efficient way.

Figure 4:
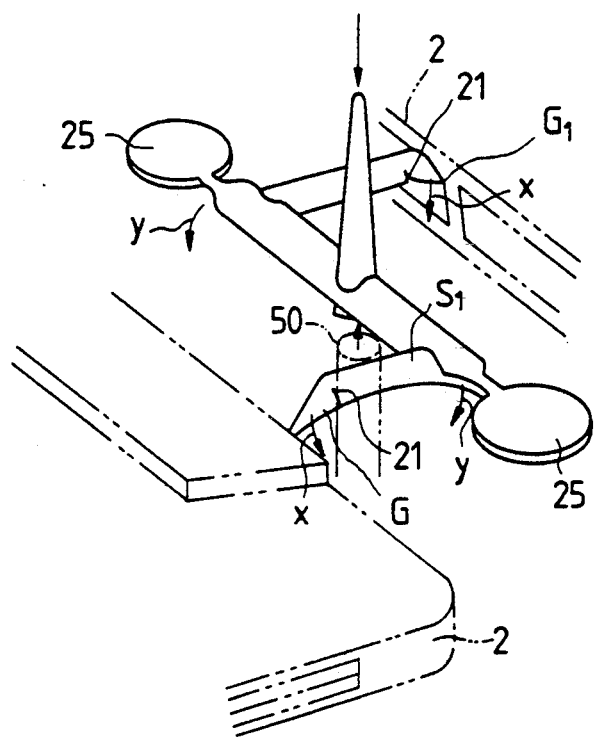
FIG. 4 is a perspective view showing an example of a sprue-runner formed when the upper half of a cassette is fabricated using the mold of the present invention.
Figure 5:
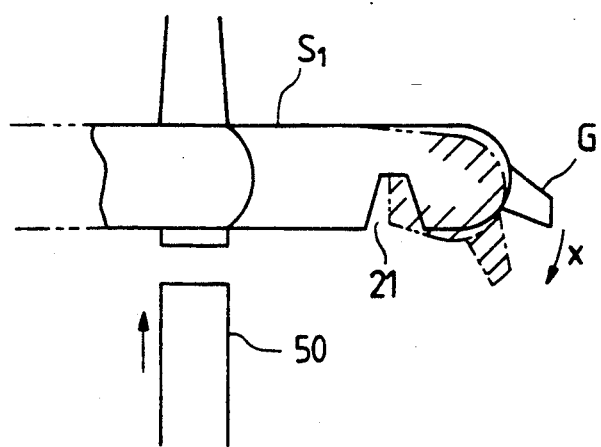
FIG. 5 is an enlarged side view of the sprue-runner with a notched portion being shown in a deformed state.
Figure 6:
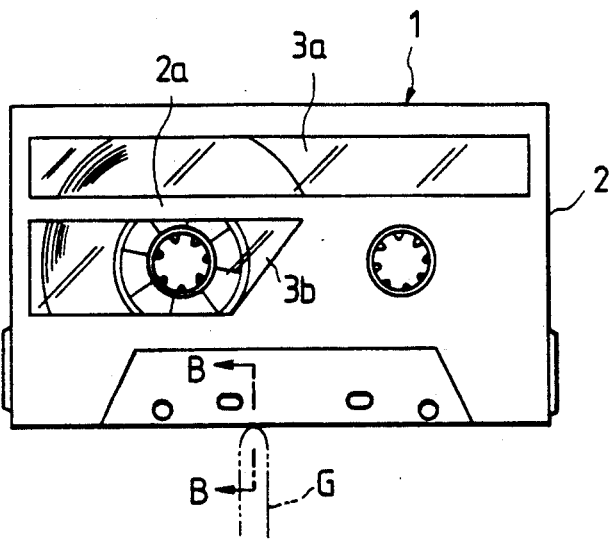
FIG. 6 is a plan view of a conventional magnetic tape cassette.
Figure 7:
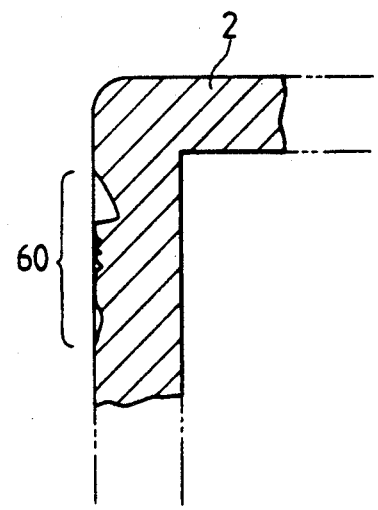
FIG. 7 is a partial sectional view taken along a line B—B in FIG. 6 of a gate mark left on the body of the cassette.
Figure 8:
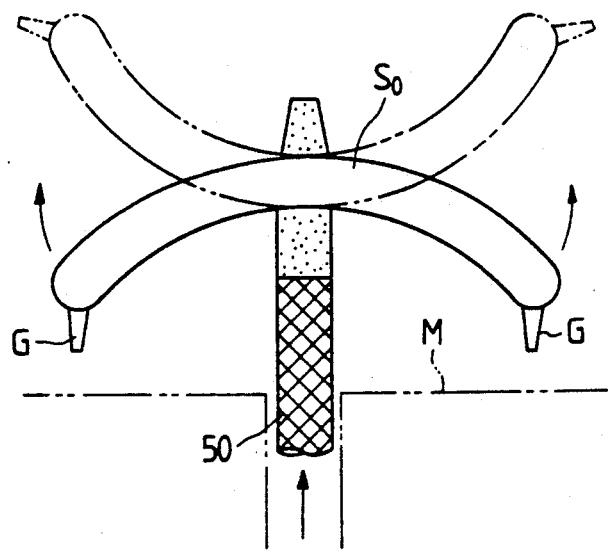
FIG. 8 is a diagram showing schematically a sprue-runner as it is deformed by being pushed with an ejector pin.

When the sprue-runner $S_1$ is pushed with the ejector pin 50 as shown in FIG. 4, the end of the sprue-runner $S_1$ will deflect downward to undergo torsional deformation with the axes of moment being offset by 90 degrees in two directions x and y, and this deflection causes an undesired vibration, as well as an unduly great impact. However, in accordance with the present invention, a notch 21 is formed in the sprue-runner $S_1$ in the vicinity of each submarine gate $G_1$ (notches 22 and 23 are formed in projections 30 and 40, respectively, and are shown in FIGS. 2 and 3 as part of these projections). The advantage of these notched portions is that their flexible nature produces a buffering action. To take the portion having notch 21 as an example, that portion will bend as shown in FIG. 5 when the sprue-runner $S_1$ is pushed with the ejector pin 50, and the end of the sprue-runner $S_1$ will accordingly bend so greatly that its rigidity is substantially lost. Consequently, the impact produced by the ejector pin 50 is sufficiently reduced to ensure that only the force necessary to cut off the gate $G_1$ is exerted upon the surface of the area where it is to be cut off. The bending of the notched portion offers the additional advantage that the energy of warpage deformation of the sprue-runner $S_1$ is significantly smaller than where the notch is absent to thereby attenuate the vibration which would otherwise occur in the sprue-runner.

As a result, even if the sprue-runner $S_1$ is pushed with a strong force in the direction of thickness of the cassette, as may be done to increase the efficiency of the molding operation, the notched portion providing the buffering action described above eliminates any vibration and violent tensile force that is unnecessary for cutting off the gate $G_1$. The gate is smoothly cut off with the front edge of the gate cutting portion 7a, producing a highly satisfactory cut surface on the side sprue-runner $S_1$ since flaws such as nicks and cracks are not produced. This prevents subsequent vibration of the sprue-runners, thereby eliminating the possibility that the resin forming the end of the sprue-runner will fly into pieces. As a further advantage, the gate mark 60 on the cassette body 2 has a very good surface state.

The sprue-runner $S_1$ separated from the molded part is taken out of the mold cavity and brought to a desired location by a suction device which is placed in engagement with the lugs 25 at both ends of the sprue-runner.

Notches 21, 22 and 23 are formed by respective projections 20, 30 and 40 that are provided on the die parts 6 and 7. The size and shape of these projections are not limited in any way, except that they should neither impede the flow of injected resins nor cause the sprue-runners to be cut in the notched areas. As long as these requirements are met, the notch 21 in the vicinity of the gate $G_1$ is desirably made larger than the other notches 22 and 23 (to be cut in projections 30 and 40) since the sprue-runner $S_1$ is made of the first-injected resin which undergoes a greater extent of resin solidification than the other sprue-runners $S_2$ and $S_3$.

In the presence of notches 21, 22 and 23, the sprue-runners $S_1$, $S_2$ and $S_3$ can be cut off the cassette body 2 so easily that the overall efficiency of the molding operation is improved markedly, with the attendant advantage of preventing the cut ends from flying into pieces which would result in the various problems described above.

Although the embodiment described above relates to the case where the upper half of a cassette is produced using a two-color molding process, it should be noted that the present invention is not limited to this particular case, and that the invention may be used to mold either half of the cassette in more than two colors. It should also be mentioned that more than one notch may be provided for each submarine gate of the mold.

The mold of the present invention for use in the manufacture of a magnetic tape cassette in which a sprue-runner connected to a submarine gate is provided in the vicinity of said gate with a notch that reduces the cross-sectional area of the sprue-runner offers the following advantages: First, the flexible nature of the notched portion produces a buffering action. In other words, when the sprue-runner is pushed with an ejector pin, this portion will bend to cause substantial loss in the rigidity of the sprue-runner. Consequently, the impact produced by the ejector pin is sufficiently reduced to ensure that only the force necessary to cut off the gate is exerted upon the surface of the area where it is to be cut off. The bending of the notched portion offers the additional advantage that the energy of warpage deformation of the sprue-runner becomes sufficiently smaller than where the notch is absent, thereby attenuating the vibration which would otherwise occur in the sprue-runner.

These advantages are particularly beneficial in the case of multi-color molding where the first-injected molding resin has a tendency to undergo excessive cooling. Even if the sprue-runner is pushed with a strong force in the direction of the thickness of cassette with a view of increasing the efficiency of the molding operation, the notched portion providing the buffering action eliminates any vibration and violent tensile force that is unnecessary for cutting off the gate. The gate is smoothly cut off with the front edge of the gate cutting portion on the movable die part, producing a highly satisfactory cut surface on the side of the sprue-runner and without producing flaws such as nicks and cracks. This prevents subsequent vibration of the sprue-runner, thereby eliminating the possibility that the resin forming the end of the sprue-runner will fly into pieces. At the same time, any vibration that occurs is sufficiently attenuated to facilitate the removal of the separated sprue-runner from the mold cavity. In addition, the gate mark on the cassette body 2 yields a very good surface state.

What is claimed is:

1. A mold adapted for use with first and second resins for making a magnetic tape cassette, comprising:
   a fixed die part;
   a movable die part; and
   a plurality of movable cores located within said movable die part, said movable cores being movable within an area defined by said fixed die part and said movable die part to define a fist space when in an extended position and a second space when in a retracted position, said first and second spaces for molding respective first and second portions of a body of said cassette, a first and second passage being defined between said fixed die part and said movable die part for respectively injecting said first and second resins into said first and second spaces through respective first and second submarine gates, a sprue-runner being formed in said first passage upon solidification of said first resin, and one of said fixed and movable die parts having a projection near said first submarine gate for forming a notch in said sprue-runner which buffers the ejection of a molded part and absorbs a load of an end portion of said first submarine gate on said sprue-runner.

2. The mold of claim 1, wherein a sprue-runner is formed in said second passage upon solidification of said second resin, and one of said fixed and movable die parts having a projection near said second submarine gate for forming a notch in said sprue-runner formed in said second passage, said notch in said sprue-runner formed in said second passage being larger than said notch in said sprue-runner formed in said first passage.

3. The mold according to claim 1, wherein said plurality of movable cores have a rectangular cross-section.

4. The mold according to claim 1, wherein said plurality of movable cores are juxtaposed with each other such that each movable core contacts an adjacent movable core.

* * * * *